(12) United States Patent
England et al.

(10) Patent No.: US 9,075,995 B2
(45) Date of Patent: Jul. 7, 2015

(54) DYNAMICALLY LOADED MEASURED ENVIRONMENT FOR SECURE CODE LAUNCH

(71) Applicant: Microsoft Corporation, Redmond, WA (US)

(72) Inventors: Paul England, Bellevue, WA (US); Andrey Marochko, Redmond, WA (US); Dennis Mattoon, Redmond, WA (US); David R. Wooten, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 262 days.

(21) Appl. No.: 13/794,693

(22) Filed: Mar. 11, 2013

(65) Prior Publication Data

US 2014/0258700 A1 Sep. 11, 2014

(51) Int. Cl.
*G06F 9/24* (2006.01)
*G06F 21/57* (2013.01)
*G06F 21/51* (2013.01)

(52) U.S. Cl.
CPC .............. *G06F 21/572* (2013.01); *G06F 21/51* (2013.01); *G06F 21/575* (2013.01)

(58) Field of Classification Search
USPC ...................... 713/1, 2, 153, 161; 726/1, 2, 21
See application file for complete search history.

(56) References Cited

U.S. PATENT DOCUMENTS

| 6,564,326 | B2 * | 5/2003 | Helbig, Sr. ...................... 726/34 |
| 7,921,286 | B2 | 4/2011 | Wooten |
| 8,201,240 | B2 † | 6/2012 | Tarkkala |
| 8,286,219 | B2 * | 10/2012 | Khalid et al. ...................... 726/1 |
| 8,474,021 | B2 * | 6/2013 | Hearn et al. ...................... 726/6 |
| 2006/0161769 | A1 * | 7/2006 | Hunter et al. .................. 713/164 |
| 2006/0224878 | A1 | 10/2006 | Datta et al. |
| 2009/0125716 | A1 * | 5/2009 | Wooten .......................... 713/164 |
| 2009/0172378 | A1 | 7/2009 | Kazmierczak et al. |

(Continued)

OTHER PUBLICATIONS

International Search Report & Written Opinion for PCT Application No. PCT/US2014/020447, Mailed Date: May 15, 2014, Filed Date: Mar. 5, 2014, 12 Pages.

(Continued)

*Primary Examiner* — Vincent Tran
(74) *Attorney, Agent, or Firm* — Julie Kane Akhter; Danielle Johnston Holmes; Micky Minhas (57) ABSTRACT

A "Secure Code Launcher" establishes platform trustworthiness, i.e., a trusted computing base (TCB), and uses hardware or firmware based components to securely launch one or more software components. The Secure Code Launcher measures and loads software components by interfacing with security extension functionality integral to one or more hardware or firmware-based components in the computing device. For example, various embodiments of the Secure Code Launcher include firmware-based components that interface with security extension functionality integral to the computing device to measure and load boot managers, operating system (OS) loaders, or other OS components including OS kernels. Similarly, the Secure Code Launcher is capable of measuring and loading software components responsible for installing an instance of an OS. In addition, various embodiments of the Secure Code Launcher provide a hypervisor loader that measures and loads a hypervisor which in turn measures and loads operating system components including virtual machines.

20 Claims, 6 Drawing Sheets

Operational Flow of the Secure Code Launcher

(56) References Cited

U.S. PATENT DOCUMENTS

| | | | |
|---|---|---|---|
| 2009/0327678 A1* | 12/2009 | Dutton et al. | 713/2 |
| 2010/0281273 A1 | 11/2010 | Lee et al. | |
| 2011/0161648 A1* | 6/2011 | Ekberg et al. | 713/2 |
| 2011/0258426 A1* | 10/2011 | Mujtaba et al. | 713/2 |
| 2012/0163589 A1 | 6/2012 | Johnson et al. | |
| 2012/0255017 A1* | 10/2012 | Sallam | 726/24 |
| 2012/0260345 A1 | 10/2012 | Quinn et al. | |
| 2012/0324236 A1 | 12/2012 | Srivastava et al. | |
| 2014/0215196 A1* | 7/2014 | Berlin | 713/2 |
| 2014/0245444 A1* | 8/2014 | Lutas et al. | 726/24 |

OTHER PUBLICATIONS

"Intel Trusted Execution Technology—Preliminary Architecture Specification", Published on: Aug. 2007, Available at: http://class.ece.iastate.edu/tyagi/cpre681/papers/iTXT31516804.pdf.

Kauer, Bernhard, "OSLO: Improving the Security of Trusted Computing", In Proceedings of 16th USENIX Security Symposium on USENIX Security Symposium, Aug. 2007, 9 Pages.

"Creating a Secure Computing Environment", Published on: Dec. 31, 2009, Available at: http://www.intel.de/content/dam/www/public/us/en/documents/technology-briefs/creating-secure-environment-brief.pdf.

Raj, et al., "Credo: Trusted Computing for Guest VMs with a Commodity Hypervisor", Retrieved at <<http://research.microsoft.com/pubs/157213/hs.pdf>>, In Microsoft Technical Report—MSR-TR-2011-130, Dec. 16, 2011, pp. 12.

Garriss, et al., "Trustworthy and Personalized Computing on Public Kiosks", Retrieved at <<http://citeseerx.ist.psu.edu/viewdoc/download?doi=10.1.1.141.7867&rep=rep1&type=pdf>>, In the Sixth International Conference on Mobile Systems, Applications and Services, Jun. 17, 2008, pp. 12.

Vasudevan, et al., ""It's an App. It's a Hypervisor. It's a Hypapp": Design and Implementation of an eXtensible and Modular Hypervisor Framework", Retrieved at <<http://repository.cmu.edu/cgi/viewcontent.cgi?article=1104&context=cylab>>, In Technical Report—CMU-CyLab-12-014, Jun. 26, 2012, pp. 14.

"Intel® Trusted Execution Technology (Intel® TXT)", Retrieved at <<http://download.intel.com/technology/security/downloads/315168.pdf>>, In White Paper of Intel, Mar. 2011, pp. 112.

\* cited by examiner
† cited by third party

DYNAMICALLY LOADED MEASURED ENVIRONMENT FOR SECURE CODE LAUNCH

BACKGROUND

A Trusted Computing Base (TCB) is typically defined as the portion of a system that is relied on to enforce the security policy of a computing platform. Over time, modern TCBs have become complex, thus making it increasingly difficult to prove or otherwise verify that a TCB is properly and securely established for a particular computing platform. Evaluation of the security and integrity of the platform state is also difficult when the trustworthiness of platform firmware or BIOS cannot be established.

Existing techniques for addressing TCB verification issues generally rely on static measurement of binaries and system configuration elements. Unfortunately, such solutions tend to be brittle, meaning that any change to the system state (no matter the significance) requires re-evaluation and measurement. Existing techniques are also limited to platform startup and to software components in the boot path.

As is well known to those skilled in the art, the term "measurement" when used with respect to trusted computing refers to evaluating or measuring software binaries or other code such that the measurement result is both unique and indicates changes in the executable. One common method for performing software measurement is to apply a cryptographic hash algorithm to the software. Such algorithms will produce different results where even one-bit changes to the measured software have occurred. Cryptographic hash algorithms also typically produce outputs that are sufficiently large that the potential for collisions (where two hash values are the same) is extremely small. Thus, comparing a known hash value to the hash value of measured software can be used to determine whether that software has changed from a known or expected state. As a result, these types of measurements are very useful for many TCB scenarios.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Further, while certain disadvantages of prior technologies may be noted or discussed herein, the claimed subject matter is not intended to be limited to implementations that may solve or address any or all of the disadvantages of those prior technologies.

In general, a "Secure Code Launcher," as described herein, provides various techniques for reducing the complexity of providing a trusted computing base (TCB) for arbitrary computing platforms that further provides a mechanism to unambiguously put the platform in a trustworthy state. More specifically, the Secure Code Launcher establishes the trustworthiness of arbitrary computing platforms by using hardware or firmware based components to measure and load one or more software components. Advantageously, measuring such code, using the security extension functionality integral to one or more hardware or firmware-based components in the computing device, allows the Secure Code Launcher to load such code from untrusted firmware, untrusted BIOS, or other untrusted storage while establishing the trustworthiness of that code, and the computing platform, prior to code execution, launch, or installation.

For example, in various embodiments, a firmware or software component of the Secure Code Launcher interfaces with the security extension functionality integral to one or more processors in the computing device in order to measure and load software components of an operating system (OS). In such embodiments, code for initiating a boot process of a computing device, (e.g., a boot manager, a boot loader, a hypervisor loader, etc., collectively referred to herein as "boot initializer" for purposes of discussion) is loaded from untrusted firmware, untrusted BIOS, or other untrusted storage. The boot initializer then performs actions to load an OS loader which acts to call OS kernel components to be loaded. However, rather than allowing the OS loader to directly initiate loading of the OS kernel components, the Secure Code Launcher intercepts the calls from the OS loader and then performs a secure program launch of the OS kernel components using security extension functionality integral to one or more hardware or firmware-based components in the computing device.

More specifically, the Secure Code Launcher performs measurement of the OS kernel components and then passes control to a Measured Launched Environment (MLE) and a Dynamically Loaded Measured Environment (DLME), which establish that the system state is trustworthy before passing control to the operating system kernel to complete kernel launch. Similar processes are used in various embodiments for installing a secure or trustworthy instance of the OS on arbitrary computing platforms.

In related embodiments, the Secure Code Launcher provides secure or trustworthy loading of hypervisors on arbitrary computing platforms. In other words, the Secure Code Launcher provides a hypervisor loader by interfacing with security extension functionality integral to one or more processors in the computing device to measure and load a hypervisor which in turn measures and loads operating system components including virtual machines. Note that a hypervisor, also referred to as a virtual machine manager (VMM), is a piece of computer software, firmware or hardware that creates and runs one or more instances of virtual machines on computing devices.

More specifically, in such embodiments, the OS loader loads and executes the hypervisor loader. In turn, the hypervisor loader performs initialization steps and prepares a hypervisor execution environment and state, and measures and loads a hypervisor image. Control then returns to the OS loader which then loads other kernel components. The operating system loader then performs a Secure Program Launch and control passes to the hypervisor's DLME. The hypervisor's DLME then ensures that that the computing platform is in a trustworthy state and transfers control of the system to the hypervisor. The hypervisor then enables virtualization (i.e., initializes a virtual machine) and returns control to the OS loader and, ultimately, to the OS kernel.

In view of the above summary, it is clear that the Secure Code Launcher described herein provides various techniques for establishing the trustworthiness of an arbitrary computing platform by using hardware or firmware based components to securely launch one or more software components. In addition to the just described benefits, other advantages of the Secure Code Launcher will become apparent from the detailed description that follows hereinafter when taken in conjunction with the accompanying drawing figures.

BRIEF DESCRIPTION OF THE DRAWINGS

The specific features, aspects, and advantages of the claimed subject matter will become better understood with regard to the following description, appended claims, and accompanying drawings where:

DETAILED DESCRIPTION OF THE EMBODIMENTS

In the following description of the embodiments of the claimed subject matter, reference is made to the accompanying drawings, which form a part hereof, and in which is shown by way of illustration specific embodiments in which the claimed subject matter may be practiced. It should be understood that other embodiments may be utilized and structural changes may be made without departing from the scope of the presently claimed subject matter.

1.0 Introduction:

In general, a "Secure Code Launcher," as described herein, establishes platform trustworthiness, i.e., a trusted computing base (TCB), and uses hardware or firmware based components to securely launch one or more software components. The Secure Code Launcher measures and loads software components by interfacing with security extension functionality integral to one or more hardware or firmware-based components in the computing device. More specifically, in various embodiments, the Secure Code Launcher uses security extensions integral to computer processors, such as, for example, Dynamic Root of Trust for Measurement (DRTM) and Intel® Trusted Execution Technology (TXT) in order to establish the trustworthiness of the platform for secure program launch.

For example, various embodiments of the Secure Code Launcher include firmware-based components that interface with security extension functionality integral to the computing device to measure and load boot managers, operating system (OS) loaders, or other OS components including OS kernels. Similarly, the Secure Code Launcher is capable of measuring and loading software components responsible for installing an instance of an OS. In addition, various embodiments of the Secure Code Launcher provide a hypervisor loader that measures and loads a hypervisor which in turn measures and loads operating system components including virtual machines.

One of the limitations of conventional techniques for using security extension hardware integral to processors, e.g., conventional DRTM-based techniques, is that while they can provide a secure computing platform for launching code, they fail to provide a mechanism for enabling secure code launch in a pre-boot environment. Further, existing mechanisms for hibernation and resume of computing systems presume either the physical security of the computing system, or full disk encryption. As such, another limitation of conventional techniques for using security extension hardware integral to processors is that they are unable to ensure secure hibernation and resume of computing systems in the case of a guest hypervisor scenario where physical security of the computing system or full disk encryption is not available.

Advantageously, a trustworthy platform state is established or verified by the Secure Code Launcher, regardless of the presence of untrusted firmware or BIOS, by interfacing with security extensions and functionality integral to processors to ensure secure program launch. Capabilities provided by the Secure Code Launcher generally include, but are not limited to, the following:

Measuring and loading a boot manager, operating system loader, and other operating system components including an operating system kernel;

Measuring and loading a software component that is responsible for installing an instance of an operating system of a computing platform;

Providing a hypervisor loader that measures and loads a hypervisor which in turn measures and loads operating system components including virtual machines; and Providing secure hibernation and resume for guest hypervisor scenarios;

Note that while the Secure Code Launcher is operable with a wide variety of processors offering different security extensions, for purposes of explanation, the Secure Code Launcher will be described below in the context of using DRTM functionality and related security extensions. Extrapolation to other processor architectures and security extensions should then be obvious to those skilled in the art in view of the following discussion.

1.1 System Overview:

As noted above, the "Secure Code Launcher," provides various techniques for establishing or verifying the trustworthiness of an arbitrary computing platform by using hardware or firmware based components to securely launch one or more software components in cooperation with security extension functionality integral to one or more processors or other hardware in a computing device. This functionality is enabled by providing a Dynamically Loaded Measured Environment (DLME) for use in measuring various software components in a pre-boot environment before those software components can be executed.

In general, various embodiments of the Secure Code Launcher interface with the security extension functionality integral to one or more processors in the computing device in order to measure and load various software components. In a pre-boot or pre-OS installation environment, the boot process generally begins with firmware or hardware (e.g., BIOS, UEFI, etc.) loading a boot manager, a boot loader, a hypervisor loader, etc., (collectively referred to herein as a "boot initializer" for purposes of discussion) depending on whether the computing platform is performing OS boot, OS installation, VMM installation or initialization, etc. The boot initializer is loaded from untrusted firmware, untrusted BIOS, or other untrusted storage. The boot initializer then performs actions to call various OS components, OS kernel components, hypervisors, etc., to be loaded. However, rather than allowing the boot initializer to directly initiate loading of the various software components, the Secure Code Launcher intercepts the calls from the boot initializer and then performs a secure program launch of the software components using security extension functionality integral to one or more hardware or firmware-based components in the computing device.

Figure 1:
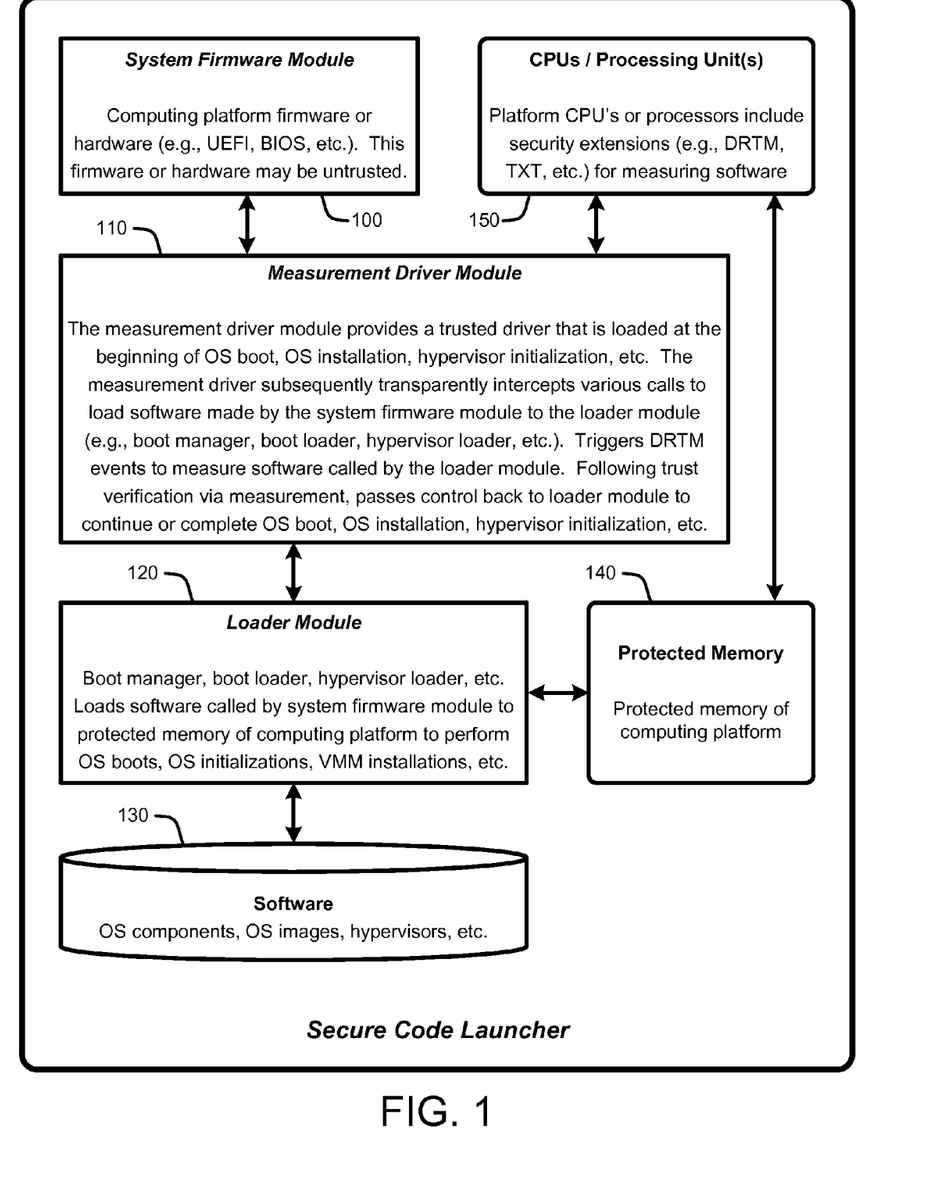
FIG. 1 provides an exemplary architectural flow diagram that illustrates program modules for implementing various embodiments of the Secure Code Launcher, as described herein.

The processes summarized above are illustrated by the general system diagram of FIG. 1. In particular, the system diagram of FIG. 1 illustrates the interrelationships between program modules for implementing various embodiments of the Secure Code Launcher, as described herein. Furthermore, while the system diagram of FIG. 1 illustrates a high-level view of various embodiments of the Secure Code Launcher, FIG. 1 is not intended to provide an exhaustive or complete illustration of every possible embodiment of the Secure Code Launcher as described throughout this document.

In addition, it should be noted that any boxes and interconnections between boxes that may be represented by broken or dashed lines in FIG. 1 represent alternate embodiments of the Secure Code Launcher described herein, and that any or all of these alternate embodiments, as described below, may be used in combination with other alternate embodiments that are described throughout this document.

More specifically, as illustrated by FIG. 1, the processes enabled by the Secure Code Launcher begin operation using a system firmware module 100 of an arbitrary computing platform to initiate code execution in a pre-boot environment by first loading a measurement driver module 110. Note that examples of typical computing platform firmware or hardware include, but are not limited to, UEFI, BIOS, etc. Further, this computing platform firmware or hardware may be untrusted without affecting the performance or capabilities of the Secure Code Launcher.

In a conventional pre-boot environment, the system firmware module 100 would directly call a loader module 120. Typical loader modules include, but are not limited to, boot managers, boot loaders, hypervisor loaders, etc. The loader module 120 then loads the boot manager, boot loader, hypervisor loader, etc., to protected memory 140 of computing platform to perform OS boots, OS initializations, VMM installations, etc., by loading various software 130 (e.g., OS components, OS images, hypervisors, etc.) to protected memory for execution by one or more CPUs or processing units 150 of the computing platform.

However, since the Secure Code Launcher causes the system firmware module 100 to first load the measurement driver module 110, the measurement driver module is capable of transparently intercepting various calls to load software made by the system firmware module to the loader module 120, and is also capable of intercepting calls made by the loader module 120 to load other software 120 components to protected memory 140.

Consequently, the measurement driver module 110 acts to intercept calls from the system firmware module 100 and the loader module 120 to load various software 120 components. The measurement driver module 110 then acts to trigger DRTM events to measure any boot initializer called by the system firmware module 100 as well as any software 130 called by the boot initializer of the loader module 110. More specifically, the measurement driver module 110 interfaces with the CPUs or processing units 150 to initiate DRTM events to measure any called boot initializers and other software 130 components. Following trust verification via measurement by the DRTM event, the measurement driver module 110 then passes control back to boot initializer of the loader module 120 to continue or complete OS boot, OS installation, hypervisor initialization, etc.

2.0 Operational Details of the Secure Code Launcher:

The above-described program modules are employed for implementing various embodiments of the Secure Code Launcher. As summarized above, the Secure Code Launcher provides various techniques for establishing the trustworthiness of an arbitrary computing platform by using hardware or firmware based components to securely launch one or more software components in pre-boot environments. The following sections provide a detailed discussion of the operation of various embodiments of the Secure Code Launcher, and of exemplary methods for implementing the program modules described in Section 1 with respect to FIG. 1. In particular, the following sections provides examples and operational details of various embodiments of the Secure Code Launcher, including:

General definitions and acronyms used to describe various embodiments of the Secure Code Launcher;
Operational overview of the Secure Code Launcher;
Secure program launch during pre-boot;
Secure hibernation and resume; and
Secure program launch and secure provisioning.

2.1 General Definitions:

Measurement:

Conventionally, the term "measurement" with respect to trusted computing refers to evaluating or measuring software binaries or other code such that the measurement result is both unique and indicates changes in the executable. As such, the resulting measurements can be compared to known information (e.g., a cryptographic hash value) to determine whether that software has been changed from a known or trusted state.

Measured Launched Environment (MLE):

Conventionally, a controlling environment is provided by system software such as an OS kernel or VMM. Software launched using security functionality integral to various hardware (e.g., "Safer Mode Extensions" (SMX) instructions integral to various Intel® processors) is known as the Measured Launched Environment (MLE). In other words, the MLE establishes system state (transitions processor mode, establishes page table and enables paging, etc.) then loads and measures the DLME.

Dynamically Loaded Measured Environment (DLME):

A DLME component of the Secure Code Launcher interfaces with the MLE and intercepts calls made in a pre-boot environment to establish that the system state is trustworthy before passing control to an operating system kernel.

Trusted Computing Base (TCB):

Conventionally, a TCB is typically defined as the portion of a system that is relied on to enforce the security policy of the platform. In order to prove that a TCB has been properly established on a platform, and to ensure that access to sealed data is only allowed on proper establishment of the TCB, a Root of Trust for Measurement (RTM) is defined.

Root of Trust for Measurement (RTM):

The well-known Trusted Computing Group (TCG) defines a conventional RTM that executes on each platform reset; it creates the chain of trust from reset to OS load. As these measurements execute on each platform reset, the TCG defines this type of RTM as a Static RTM (SRTM). Various operating systems such as, for example, Windows® make use of the SRTM mechanism during the boot process.

Static Root of Trust for Measurement (SRTM):

Conventional SRTM measurements are taken during the boot process with the intent of being able to demonstrate, through a Platform Configuration Register (PCR), what software was run during boot. PCRs are registers that hold software measurement values in a secure location (e.g., protected memory, ACPI tables, etc.). This reflects the fact that every software component in the boot path has the potential of modifying the TCB of the loaded OS. An unfortunate property of conventional SRTM sequences is that the evaluation of the TCB of an OS has a dependency on software/firmware that has no ongoing role in the operation of the platform. Consequently, software which is loaded, run, and discarded during the boot process is evaluated to determine if it could or did compromise the TCB. To determine whether the system state is trustworthy, a TCG Event Log is presented. Further, if any software component or configuration state included in the SRTM measurements is ever changed, a new evaluation of the SRTM measurements is performed.

Dynamic Root of Trust for Measurement (DRTM):

Conventionally, DRTM provides a mechanism to unambiguously put the platform in a trustworthy state using only CPU functionality. DRTM can also be used in combination with SRTM. For example, a platform performing an SRTM boot can still take advantage of DRTM. The primary difference between DRTM and SRTM is that the DRTM chain of trust can start at any time, even with the platform hardware already configured and with memory pre-populated with an OS. A DRTM operation is initiated using specific hardware instructions that cause the processor(s) to be placed in a known state. The boot processor begins running measured code and the code that has been measured is protected from direct memory access (DMA) and cannot be modified after it is measured and before it is executed.

Unified Extensible Firmware Interface (UEFI):

UEFI is a specification that defines a software interface between an operating system and platform firmware. UEFI is meant to replace the Basic Input/Output System (BIOS) firmware interface, present in many computing devices computers. In practice, most UEFI images are provided in platform firmware or protected memory and provide legacy support for BIOS services.

2.2 Operational Overview:

Conventionally, the foundation of a trustworthy computing platform is the rooting in hardware (i.e., a hardware trusted platform module (TPM)) of the secure measurement and attestation of an operating system kernel or hypervisor and by extension the partitions above it. The existing standard approach of a Static Root of Trust Measurement (SRTM) has proven to be problematic and brittle due to the dynamic nature of option ROM extensions, extensible firmware (e.g., UEFI), and other dynamic platform features which make it difficult to determine a static trust measurement.

The Secure Code Launcher provides a Dynamic Root of Trust Measurement (DRTM)-based approach that uses a Dynamically Loaded Measured Environment (DLME) that allows measurement of the operating system kernel or a hypervisor independent from the details of the individual platform, i.e., untrusted firmware, untrusted BIOS, etc. In other words, rather than using DRTM to ensure a trusted platform, the Secure Code Launcher provides secure code launch on a platform having potentially untrusted hardware. Note however, that the Secure Code Launcher can also perform the secure code launch described herein on platforms that have been verified as being trusted using any desired techniques.

For example, in a pre-boot environment of the computing platform, after kernel components or the hypervisor is loaded and the platform firmware (e.g. BIOS/UEFI) have been released, the Secure Code Launcher uses a DLME to trigger a DRTM event that causes the current state of the system to be measured and trustworthiness attested.

Further, in the pre-boot environment, after loading the components of the OS (or hypervisor images) into main memory, the boot manager will exit boot services (no more calls to firmware/BIOS) and call the DRTM entry, the address of which is provided in an ACPI table, operating system loader block, or other memory or storage. This code performs some initial setup including rendezvousing system processors and putting the CPU in a desired execution state, and initialization of the IOMMUs. The DRTM code then invokes the CPU-architecture-dependent, secure launch instruction (e.g., SKINIT/SENTER). This will initiate the DRTM sequence. The details of the DRTM sequence from that point on vary by processor type (and whatever security extensions are available in the processor) but the basic operations are similar and are explained below.

The first step of the DRTM sequence initiated by the Secure Code Launcher is for the processor to load a block of code into the processor's cache memory and lock it in place. The CPU sends an initialization command to the TPM to prepare the TPM to start a hash sequence. Note that this initialization command is sent by the same CPU that is executing the secure launch instruction to prevent spoofing of the sequence. The bytes of the cache-locked code are sent to the TPM to be hashed. When all of the bytes of the cache-locked code have been hashed, the CPU commands the TPM to complete the hash operation. The CPU then begins to execute the commands loaded in the cache.

This first bit of DRTM code will integrity check and load a first additional piece of code (i.e., the platform's SINIT Authenticated Code Module (ACM)) that validates aspects of the hardware, including the system chipset, and then measures and executes the measured launched environment (MLE). The MLE will then establish system state (transitions processor mode, establishes page table and enables paging, etc.) and load and measure the DLME. The DLME will validate the system software manager (SSM) in the UEFI, BIOS or other firmware, and check a launch policy of the OS bundle passed in the DRTM entry call. If this OS bundle is within the launch policy, then DRTM completes and execution continues with the OS provided software. In other words, control transitions from ACM to MLE to DLME to Trusted Environment, e.g., OS, Hypervisor, Boot Loader, etc. depending on the particular boot process being measured.

During each check of DRTM code mentioned above, the integrity and authenticity of the code is checked. To be authentic, checks are made to determine whether the code has been signed by a valid entity and, optionally, whether that code has been approved for the platform on which it is being run. This means that the DRTM will not successfully complete unless the hardware and firmware is in the proper state and the code that checks the hardware and firmware is valid for the platform.

Again, as noted above, while the Secure Code Launcher is operable with a wide variety of processors offering different security extensions, for purposes of explanation, the Secure Code Launcher is being described herein in the context of using DRTM functionality and related security extensions. Extrapolation to other processor architectures and security extensions should be obvious to those skilled in the art in view of the discussion provided herein.

Further, it should also be noted that for purposes of explanation, the following discussion of the Secure Code Launcher generally refers to a Windows® OS using a UEFI-based boot scenario. However, it should be clear to those skilled in the art that the Secure Code Launcher is operable with a wide variety of different operating systems and is not intended to be limited to use with the Windows® OS or with UEFI-based firmware.

2.3 Secure Program Launch During Pre-Boot:

Advantageously, in contrast to techniques that require modifying or refactoring existing operating systems or hypervisor loaders to enable secure DRTM-based boot, the Secure Code Launcher provides various techniques that enable secure code launch without modifying existing operating systems or hypervisor loaders.

In general, the Secure Code Launcher provides a memory-based image or cache of disk and other services that are used during the boot process. Further, by providing an accurate pre-OS cache, no additional firmware services are needed before the OS loads its own drivers. These capabilities are enabled by providing various mechanisms for triggering DRTM events in UEFI, BIOS, or other firmware during pre-boot by using a "measurement driver."

More specifically, in various embodiments, the Secure Code Launcher uses the measurement driver to provide DRTM functionality in a pre-boot environment without requiring any modification to the existing OS boot path. In addition, this measurement driver has the ability to exert a great deal of control over the pre-boot UEFI environment. Unlike existing DRTM-based techniques, this allows the Secure Code Launcher to eliminate the operating system's trust dependency on the boot services environment in UEFI.

2.3.1 DRTM in Pre-Boot:

In the UEFI scenario a DRTM event is triggered by the measurement driver that is loaded at boot. During its initialization this measurement driver will take control of certain UEFI protocol functions that other boot components rely on. Allows the Secure Code Launcher to reduce or eliminate the trust-dependency on UEFI during boot. In other words, this allows the Secure Code Launcher to operate with unknown or untrusted firmware. In addition, the measurement driver provides the ability to trigger a DRTM launch of its MLE (Measured Launch Environment) in a way that is transparent to the code used to boot the OS (e.g., "bootmgr" and "winload" in the case of the Windows® OS). Note that the following discussion will use the term "boot code" to refer to both bootmgr and winload, collectively.

Note that in various embodiments, the measurement driver interfaces with any desired UEFI protocol (e.g., the EFI Block I/O Protocol of UEFI, EFI console functions, EFI Boot Services Table, etc.).

2.3.2 Boot Sequence:

During pre-boot UEFI will load the measurement driver. The driver initialization routine is responsible for assuming control over UEFI protocol elements as well as creating the disk block cache that will be used to serve I/O read requests coming from boot code, as discussed in further detail below. The EFI Boot Services table may also be modified to prevent boot code from accessing UEFI functions directly after measurement driver initialization.

After the measurement driver is initialized the boot process proceeds normally, from the perspective of the other boot components. Eventually the boot services environment is terminated by winload with a call to ExitBootServices( ). When the measurement driver then receives an exit boot services event it will prepare for and initiate the DRTM event (see Section 2.3.5 for a further discussion of DRTM events).

2.3.3 Measurement Driver Initialization:

During its initialization the measurement driver will assume control over certain UEFI protocol elements. For example, in various embodiments, the measurement driver enumerates and modifies "EFI_BLOCK_IO_PROTOCOL" structures of the UEFI as well as the "System" and "Boot Services" Table of the UEFI.

By way of example, the following section describes various exemplary techniques for using the measurement driver to manipulate the EFI_BLOCK_IO_PROTOCOL. Note that the measurement driver is not intended to be limited to the exemplary techniques described below. Other UEFI protocols may also be enumerated and modified by the measurement driver, using techniques similar to those described below, depending upon the particular DRTM events desired.

2.3.4 Measurement Driver and EFI Block I/O Protocol:

The UEFI Block I/O protocol (i.e., "EFI_BLOCK_IO_PROTOCOL") is used to abstract mass storage devices to allow code running in the UEFI boot services environment to access them without specific knowledge of the type of device or controller that manages the device. Functions are defined to read and write data at a block level. Ultimately, boot code relies on these routines for disk access.

The measurement driver enumerates EFI_BLOCK_IO_PROTOCOL structures on the running system and replaces the EFI_BLOCK_IO_PROTOCOL ReadBlocks routine in each protocol structure. This gives the measurement driver the ability to intercept and observe all disk read accesses that take place in the boot services environment. This includes disk accesses initiated by pre-OS components such as the Windows® bootmgr and winload components since the measurement driver gets control of the system before bootmgr or winload are ever loaded.

The measurement driver maintains a log of block I/O read requests made during boot. The log contains a list of Logical Block Addresses (LBAs) and sizes corresponding to each read request. When the measurement driver is initialized, it reads this log from the system partition where it is stored. Using the log, the measurement driver then creates an in-memory block cache containing each disk block that will eventually be read by boot code within the boot services environment.

During boot, disk read requests coming from bootmgr and winload are served out of the block cache. In the Windows® OS, the cache data includes things like the "ntoskrnl" image, drivers, BCD data, the registry, filesystem metadata, etc. Further, in various embodiments, the measurement driver has the ability to identify and measure PE/COFF formatted binaries (e.g., the kernel image, drivers, dll's, etc.) as they are requested by boot code via ReadBlocks requests to the EFI Block I/O subsystem. These measurements can be used to further support an assertion of trustworthiness of the platform state.

Note that in addition to handling disk reads, in various embodiments, the Secure Code Launcher uses the measurement driver to intervene on disk writes in order to take advantage of caching behavior in a manner similar to read requests, as discussed above.

Note that the Common Object File Format (COFF) is a specification of a format for executable, object code, and shared library computer files originally used on Unix systems. The most widespread use of the COFF format today is in the Microsoft® Portable Executable (PE) format. Originally developed for Windows® NT, the PE format (sometimes written as PE/COFF) uses a COFF header for object files, and as a component of the PE header for executable files. However, it should be understood that the Secure Code Launcher is not limited to operation with PE/COFF formatted binaries, and that such binaries are provided as examples with respect to the use of a Windows® OS environment.

2.3.5 DRTM Events:

During a Windows® OS boot, winload calls ExitBootServices( ) to terminate the UEFI Boot Services environment. When ExitBootServices( ) has finished its cleanup, it signals the exit boot services event. This results in a call to an exit boot services event handler in the measurement driver. When it receives this event, the measurement driver may initiate a DRTM operation (via a GETSEC[SENTER] instruction provided by the processor security extensions) and transfer control to the platform's Authenticated Code Module (ACM). Once the platform is in a known state, having been placed there by the ACM, control is transferred to the Measured Launch Environment (MLE). The MLE is provided by the measurement driver and is responsible for verifying the trustworthiness of the platform. Control then returns to the OS loader. Consequently, since the measurement driver acts as an intermediary to intercept and process various calls, the DRTM event initiated by the measurement driver is transparent to winload. In other words, from the perspective of winload, it appears to have just returned from ExitBootServices( ) and will continue its normal processing and ultimately boot the OS.

2.4 Secure Hibernation and Resume:

In general, existing hibernation mechanisms typically presume either physical system security or full disk volume encryption. However, with a guest hypervisor scenario, neither the physical security of the system nor the existence of volume based encryption can be assumed to exist. Additionally, the architecture for the hibernation of an early launch hypervisor places the unsecure root partition responsible for managing the data buffers that hold the private isolated state of the secure hypervisor.

Advantageously, the Secure Code Launcher provides various techniques that will both protect the secure state of the hypervisor from disclosure to the root partition during hibernation and to protect all of the system's hibernated memory from offline attack or migration to other physical systems. The cryptographic keys for this process are sealed to the system's TPM and only revealed after a DRTM event initiated by the measurement driver assures the trustworthiness of the resume operation.

2.5 Secure Program Launch and Secure Provisioning:

In various embodiments, the Secure Code Launcher also enables a "Secure Provisioning" process that prevents access to domain credentials and resources by untrusted hardware.

For example, as is known to those skilled in the art, a Windows® PE image can be used to install an instance of the Windows® OS on a computing platform (or on a virtual machine running on a computing platform). In general, a bootable Windows PE image is deployed on a "Preboot eXecution Environment" (PXE) server that accesses the image by way of a PXE boot.

In particular, in the case of a Windows® OS environment, a typical PXE boot request on a computing platform is made by UEFI to install a new instance of the OS. However, in contrast to typical boot requests, the Secure Code Launcher instead causes the PXE server to respond to the boot request by providing the measurement driver instead of the new OS (e.g., Windows® Imaging Format (WIM) images) and WinPE images for use in installing the new OS. In this case, the measurement driver handles initiation of the transfer of the WIM images and WinPE images for installing the new OS. First, the Secure Code Launcher uses the measurement driver to establish a trustworthy system state via DRTM. The Secure Code Launcher then uses the measurement driver to measure the WIM and WinPE images. If that measurement indicates trustworthiness of these images, the measurement driver then transfers control to the installation environment to proceed with a typical OS installation using the WIM and WinPE images.

Further, in various embodiments, when the measurement driver makes the request for the WIM and WinPE images for the new OS, it also provides a public portion of a key pair contained in the TPM to a deployment server. If that public key is recognized and validated by the deployment server, then the computing platform is recognized as an authorized machine and the deployment server will respond by providing the WIM and WinPE images for the new OS as well as the corresponding domain credentials both "sealed" to the authorized machine and image hashes. Then, when control is transferred to the installation environment the installation process proceeds as normal.

Figure 2:
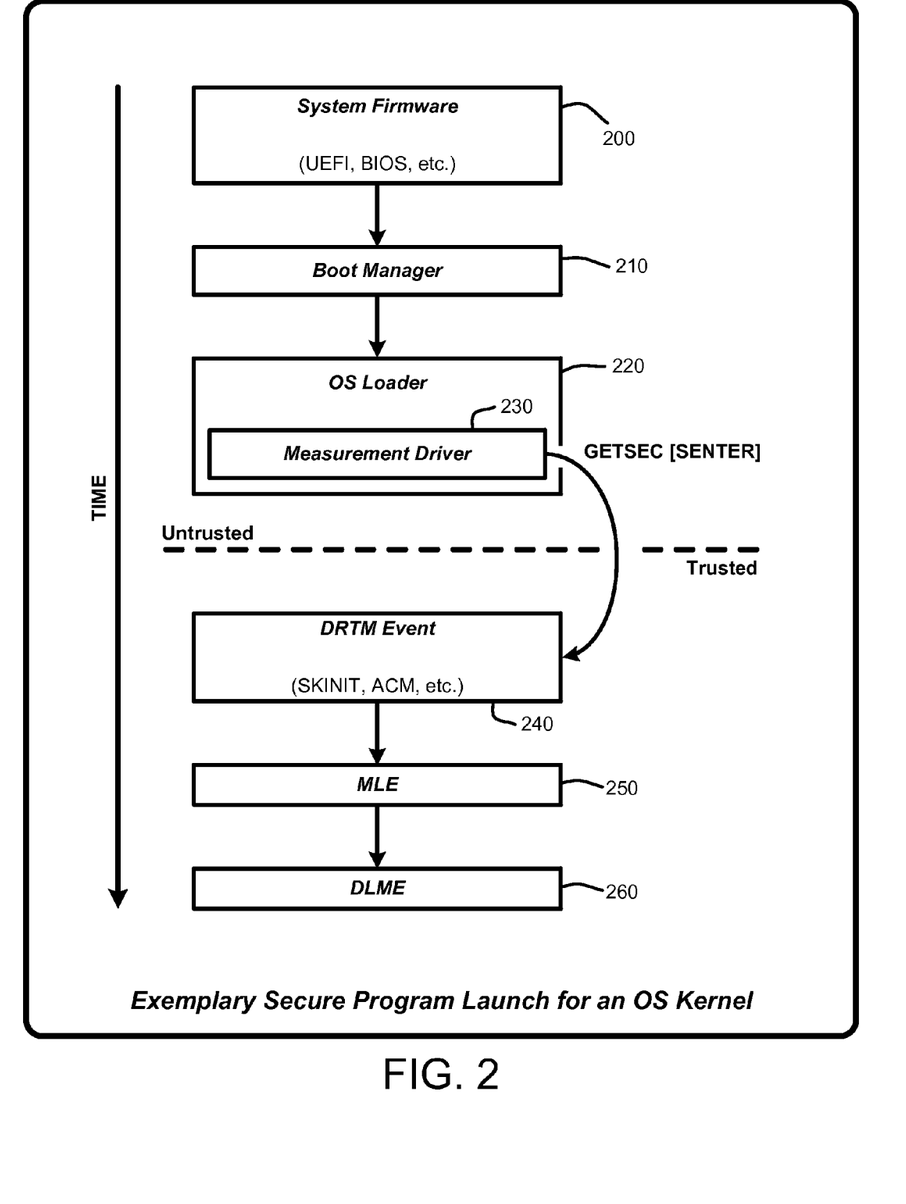
FIG. 2 illustrates an exemplary process for performing secure loading and launch of an operating system kernel from untrusted BIOS or other firmware, as described herein.

2.6 Exemplary Scenarios for Using the Secure Code Launcher:

FIG. 2 illustrates an exemplary scenario for using the Secure Code Launcher to perform secure program launch in a pre-boot environment. In particular, FIG. 2 shows an exemplary process for performing secure loading and launch of an operating system kernel from untrusted BIOS or other system firmware 200. First, the BIOS or firmware 200 loads a boot manager 210. The boot manager 210 then loads an OS loader 220. A previously loaded measurement driver 230 includes event handlers that listen for and intercept software load commands issued by the OS loader 220 to load and measure operating system kernel components by initiating DRTM events 240. A secure program launch is then performed (e.g., via SKINIT/SENTER at the lowest level) and control passes to a Measured Launch Environment (MLE) 250 and a Dynamically Loaded Measured Environment (DLME) 260, which establish that the system state is trustworthy before passing control to the operating system kernel to continue the boot process.

Figure 3:
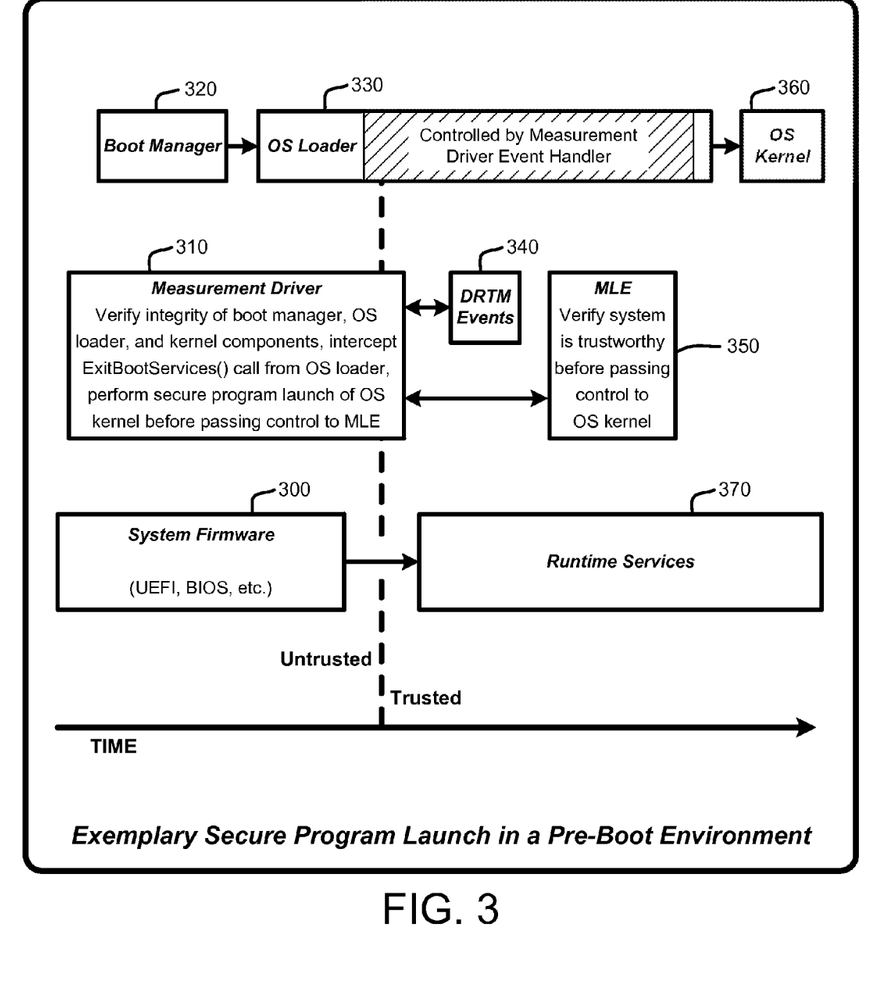
FIG. 3 illustrates an exemplary process for performing secure loading and launch of an operating system from untrusted BIOS or other firmware, as described herein.

FIG. 3 illustrates an exemplary scenario for using the Secure Code Launcher for performing secure loading and launch of an operating system kernel from untrusted BIOS or other system firmware 300, as described herein. In particular, FIG. 3 illustrates operation of the Secure Code Launcher in a pre-boot environment where a measurement driver 310 (either measured to verify trust, or loaded from a trusted source) is loaded by untrusted system firmware 300 and assumes control of aspects of the boot services environment by using an event handler to listen for and intercept calls made by an OS loader 330. In various embodiments, these calls also include disk accesses (including disk reads and writes). The measurement driver 310 initiates DRTM events 340 to verify the integrity of the boot manager 320, OS loader 330, and various kernel components loaded thereby. When the OS loader 330 has finished with the boot services environment the measurement driver intercepts a corresponding ExitBootServices(s) call from the OS loader and a secure program launch is performed (e.g., via SKINIT/SENTER). Control then passes to the MLE 350, which establishes that the system is in a trustworthy state and subsequently passes control to the OS kernel 360.

Figure 4:
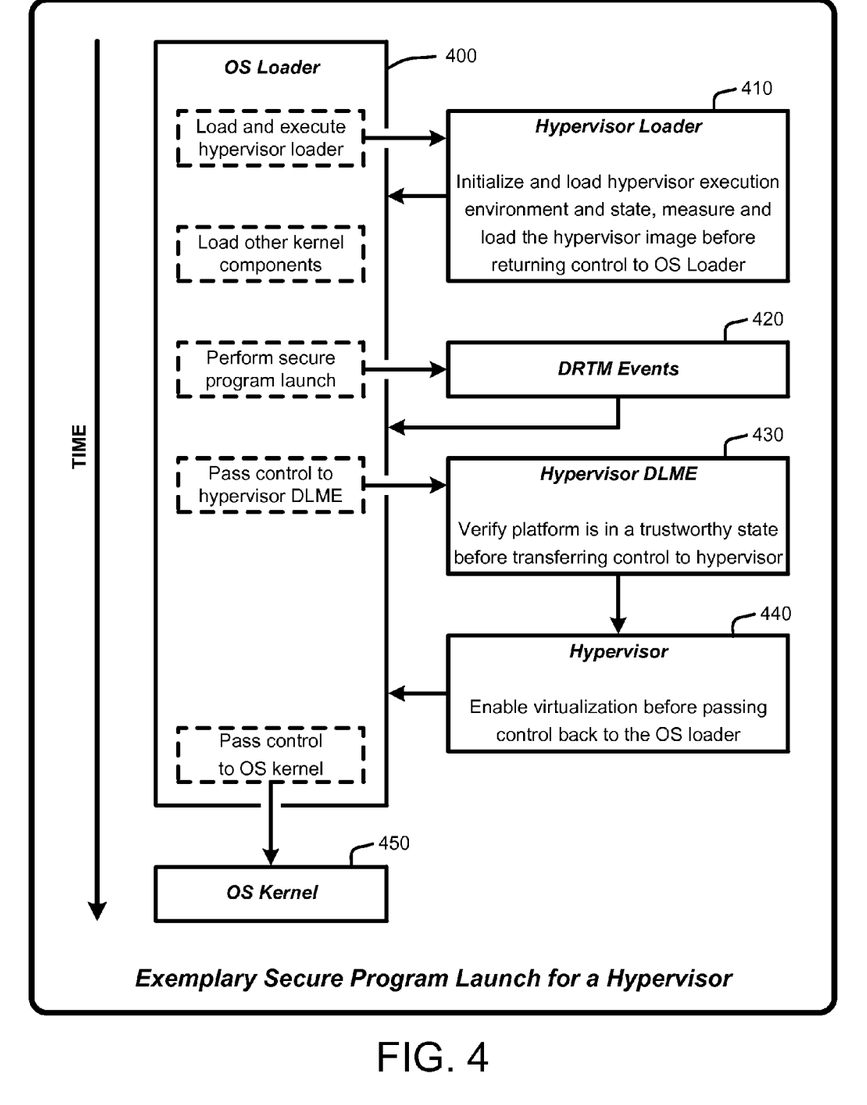
FIG. 4 illustrates an exemplary process for performing secure loading and launch of a hypervisor loader from untrusted BIOS or other firmware, as described herein.

FIG. 4 illustrates an exemplary scenario for using the Secure Code Launcher for using an OS loader 400 in combination with a previously loaded measurement driver for performing secure loading and launch of a hypervisor loader 410. In particular, the OS loader 400 initially loads and execute a hypervisor loader 410 (using the measurement driver to measure the hypervisor loader). The hypervisor loader 410 then performs initialization steps and prepares a hypervisor execution environment and state, and measures and loads a hypervisor image. Control returns to the OS loader 400 which then loads (and measures via the measurement driver) other kernel components. The OS loader 400 then performs a secure program launch (via the measurement driver) and control passes to the hypervisor's Dynamically Loaded Measured Environment (DLME) 430. The hypervisor's DLME 430 then establishes that the platform is in a trustworthy state and transfers control of the system to a hypervisor 440. The hypervisor 440 enables virtualization and returns control to the OS loader 400, which in turn passes control to the OS kernel 450.

Figure 5:
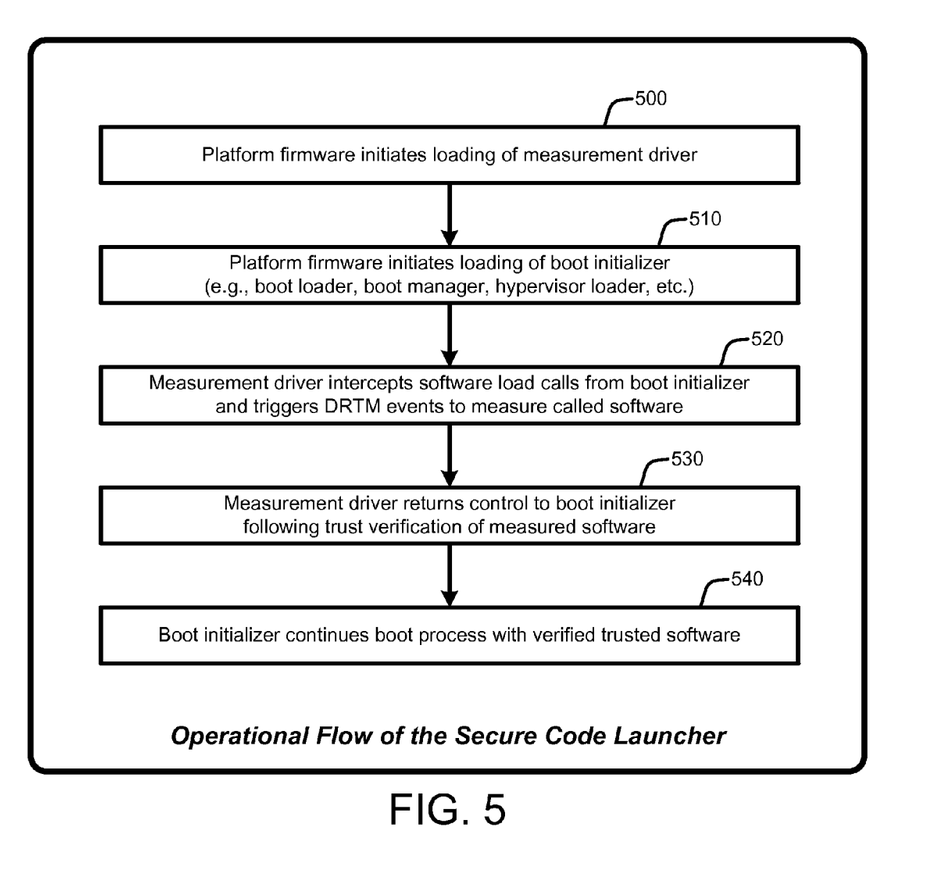
FIG. 5 illustrates a general system flow diagram that illustrates exemplary methods for implementing various embodiments of the Secure Code Launcher, as described herein.

3.0 Operational Summary of the Secure Code Launcher:

The processes described above with respect to FIG. 1 through FIG. 4, and in further view of the detailed description provided above in Sections 1 and 2, are illustrated by the general operational flow diagram of FIG. 5. In particular, FIG. 5 provides an exemplary operational flow diagram that summarizes the operation of some of the various embodiments of the Secure Code Launcher. Note that FIG. 5 is not intended to be an exhaustive representation of all of the various embodiments of the Secure Code Launcher described herein, and that the embodiments represented in FIG. 5 are provided only for purposes of explanation.

Further, it should be noted that any boxes and interconnections between boxes that may be represented by broken or dashed lines in FIG. 5 represent optional or alternate embodiments of the Secure Code Launcher described herein, and that any or all of these optional or alternate embodiments, as described below, may be used in combination with other alternate embodiments that are described throughout this document.

In general, as illustrated by FIG. 5, the Secure Code Launcher begins operation by using platform firmware (either trusted or untrusted) to initiate 500 loading of a measurement driver. The platform firmware then initiates 510 loading of a boot initializer (e.g., boot manager, boot loader, hypervisor loader, etc.). The measurement driver then intercepts 520 software load calls made by the boot initializer and triggers DRTM events to measure the called software. Next, as illustrated by element 530, the measurement driver then returns control to the boot initializer following trust verification of the measured software. Finally, the boot initializer continues 540 the boot process with verified trusted software components.

Figure 6:
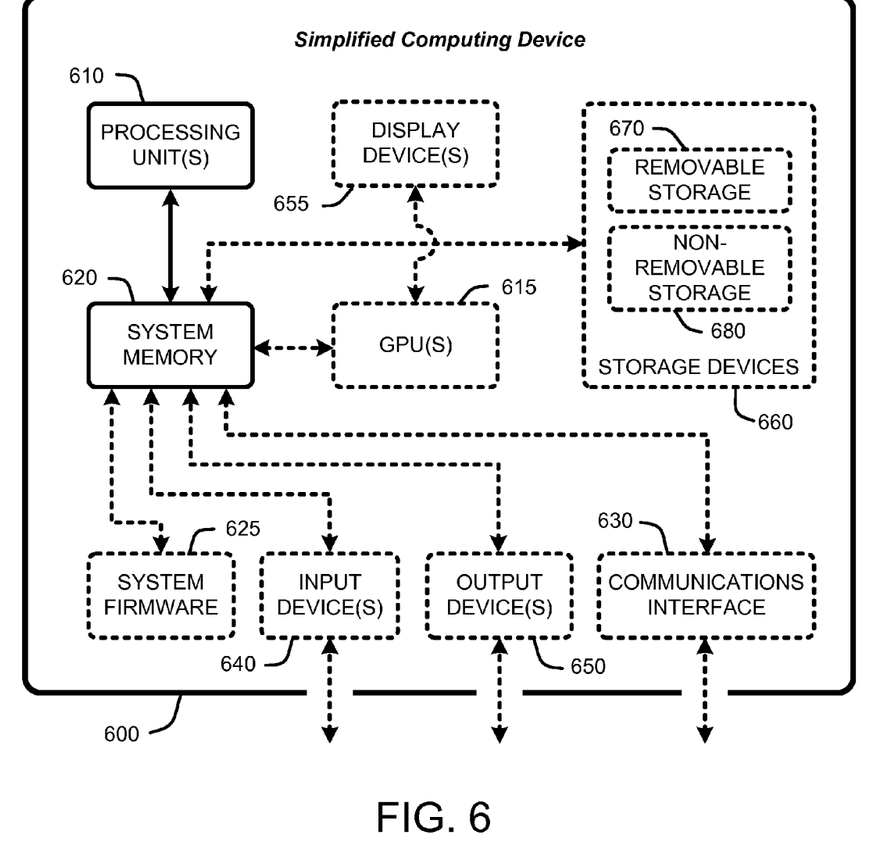
FIG. 6 is a general system diagram depicting a simplified general-purpose computing device having simplified computing and I/O capabilities for use in implementing various embodiments of the Secure Code Launcher, as described herein.

4.0 Exemplary Operating Environments:

The Secure Code Launcher described herein is operational within numerous types of general purpose or special purpose computing system environments or configurations. FIG. 6 illustrates a simplified example of a general-purpose computer system on which various embodiments and elements of the Secure Code Launcher, as described herein, may be implemented. It should be noted that any boxes that are represented by broken or dashed lines in FIG. 6 represent alternate embodiments of the simplified computing device, and that any or all of these alternate embodiments, as described below, may be used in combination with other alternate embodiments that are described throughout this document.

For example, FIG. 6 shows a general system diagram showing a simplified illustration of a computing device 600. Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, audio or video media players, etc.

To allow a computing device 600 to implement the Secure Code Launcher, the device should have a sufficient computational capability and system memory to enable basic computational operations. Further, the computing device 600 may also include optional system firmware 625 (or other firmware or processor accessible memory or storage) for use in implementing various embodiments of the Secure Code Launcher. In particular, as illustrated by FIG. 6, the computational capability is generally illustrated by one or more processing unit(s) 610, and may also include one or more GPUs 615, either or both in communication with system memory 620. Note that that the processing unit(s) 610 of the general computing device of may be specialized microprocessors, such as a DSP, a VLIW, or other micro-controller, or can be conventional CPUs having one or more processing cores, including specialized GPU-based cores in a multi-core CPU.

In addition, the simplified computing device of FIG. 6 may also include other components, such as, for example, a communications interface 630. The simplified computing device of FIG. 6 may also include one or more conventional computer input devices 640 or combinations of such devices (e.g., pointing devices, keyboards, audio input devices, voice or speech-based input and control devices, video input devices, haptic input devices, touch input devices, devices for receiving wired or wireless data transmissions, etc.). The simplified computing device of FIG. 6 may also include other optional components, such as, for example, one or more conventional computer output devices 650 (e.g., display device(s) 655, audio output devices, video output devices, devices for transmitting wired or wireless data transmissions, etc.). Note that typical communications interfaces 630, input devices 640, output devices 650, and storage devices 660 for general-purpose computers are well known to those skilled in the art, and will not be described in detail herein.

The simplified computing device of FIG. 6 may also include a variety of computer readable media. Computer readable media can be any available media that can be accessed by computing device 600 via storage devices 660 and includes both volatile and nonvolatile media that is either removable 670 and/or non-removable 680, for storage of information such as computer-readable or computer-executable instructions, data structures, program modules, or other data. By way of example, and not limitation, computer readable media may comprise computer storage media and communication media. Computer storage media refers to tangible computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Storage of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Retention of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer to a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Further, software, programs, and/or computer program products embodying the some or all of the various embodiments of the Secure Code Launcher described herein, or portions thereof, may be stored, received, transmitted, or read from any desired combination of computer or machine readable media or storage devices and communication media in the form of computer executable instructions or other data structures.

Finally, the Secure Code Launcher described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

The foregoing description of the Secure Code Launcher has been presented for the purposes of illustration and description. It is not intended to be exhaustive or to limit the claimed subject matter to the precise form disclosed. Many modifications and variations are possible in light of the above teaching. Further, it should be noted that any or all of the aforementioned alternate embodiments may be used in any combination desired to form additional hybrid embodiments of the Secure Code Launcher. It is intended that the scope of the invention be limited not by this detailed description, but rather by the claims appended hereto. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for providing secure program launch, comprising:
   instantiate an event handler in a pre-boot environment of the computing device;
   instantiate a boot initializer in the pre-boot environment of the computing device;
   using the event handler to intercept software load commands issued by the boot initializer;
   for each intercepted load command, initiating a software measurement of a corresponding software component; and
   following each measurement, performing a secure program launch of the corresponding measured software component.

2. The method of claim 1 wherein the software measurement is performed by causing the event handler to initiate a Dynamic Root of Trust for Measurement (DRTM) event.

3. The method of claim 2 wherein each DRTM event makes use of a security extension of a processor of the computing device to perform the software measurement.

4. The method of claim 2 wherein each DRTM event loads the corresponding software component to protected memory of the computing device and causes a trusted platform module of the computing device to compute a hash sequence for the software component.

5. The method of claim 1 wherein the event handler and boot initializer are instantiated by a firmware component of the computing device.

6. The method of claim 5 wherein the firmware component of the computing device is untrusted.

7. The method of claim 1 wherein the boot initializer is allowed to continue boot operations on the computing device following secure program launch of the measured software components.

8. The method of claim 1 wherein the boot initializer is used to measure and perform secure program launch of a hypervisor called by the boot initializer.

9. The method of claim 8 wherein the computing device contains two or more processor cores, and wherein a separate hypervisor is measured and securely launched for two or more the processor cores.

10. The method of claim 1 wherein the event handler is used to measure and perform secure program launch of an operating system kernel called by the boot initializer.

11. A system for measuring software in a pre-boot environment, comprising:
    a computing device having firmware for initiating a pre-boot environment;
    an event handler device for intercepting software load commands issued by a boot initializer in the pre-boot environment;
    a measurement device for initiating a measurement of a software component corresponding to each intercepted software load command; and
    a device for performing a secure program launch of each measured software component.

12. The system of claim 11 wherein each software measurement is performed by initiating a Dynamic Root of Trust for Measurement (DRTM) event that makes use of security extension functionality of a processor of the computing device.

13. The system of claim 12 wherein each DRTM event loads the corresponding software component to protected memory of the computing device and causes a trusted platform module of the computing device to compute a hash sequence for the software component.

14. The system of claim 11 wherein the firmware of the computing device is untrusted.

15. The system of claim 11 wherein the boot initializer is allowed to continue boot operations on the computing device following secure program launch of the measured software components.

16. The system of claim 11 wherein the computing device contains two or more processor cores, and wherein a separate hypervisor software component is measured and securely launched for two or more the processor cores.

17. A computer-readable storage device having computer executable instructions stored therein, said instructions causing a computing device to perform actions comprising:
- causing firmware of a computing device to initiate a pre-boot environment on the computing device;
- instantiating a driver module having an event handler into protected memory of the computing device;
- instantiating a boot initializer into protected memory of the computing device;
- using the event handler of the driver module to intercept software load commands issued by the boot initializer;
- for each intercepted load command, using the driver module to initiate a software measurement of a corresponding software component; and
- following each measurement, performing a secure program launch of the corresponding measured software component.

18. The computer-readable storage device of claim 17 wherein each software measurement is performed by initiating a Dynamic Root of Trust for Measurement (DRTM) event that makes use of security extension functionality of a processor of the computing device.

19. The computer-readable storage device of claim 18 wherein each DRTM event loads the corresponding software component into protected memory of the computing device and causes a trusted platform module of the computing device to compute a hash sequence for the software component.

20. The computer-readable storage device of claim 17 wherein the computing device contains two or more processor cores, and wherein a separate hypervisor software component is measured and securely launched for two or more the processor cores.

* * * * *